US012152549B2

(12) United States Patent
Gande et al.

(10) Patent No.: US 12,152,549 B2
(45) Date of Patent: Nov. 26, 2024

(54) METHOD AND SYSTEM FOR CALIBRATING A CONTROLLER OF AN ENGINE

(71) Applicant: AVL LIST GMBH, Graz (AT)

(72) Inventors: Marie-Sophie Gande, Gratkorn (AT); Stefan Scheidel, Graz (AT); Philip Williams, Hart bei Graz (AT); Andreas Wagner, Lannach (AT); Takuya Sato, Graz (AT); Yoann Collet, Bures-sur-Yvette (FR); Helmut Peter Grassberger, Graz (AT); Mats Ivarson, Gratwein-Straßengel (AT); Ganesh Balachandran, Graz (AT); Markus Herzer, Graz (AT)

(73) Assignee: AVL LIST GMBH, Graz (AT)

( * ) Notice: Subject to any disclaimer, the term of this patent is extended or adjusted under 35 U.S.C. 154(b) by 71 days.

(21) Appl. No.: 17/776,037

(22) PCT Filed: Nov. 12, 2020

(86) PCT No.: PCT/AT2020/060400
§ 371 (c)(1),
(2) Date: May 11, 2022

(87) PCT Pub. No.: WO2021/092640
PCT Pub. Date: May 20, 2021

(65) Prior Publication Data
US 2022/0381196 A1 Dec. 1, 2022

(30) Foreign Application Priority Data
Nov. 12, 2019 (AT) .............. A 50969/2019

(51) Int. Cl.
*F02D 41/24* (2006.01)
*G05B 13/04* (2006.01)

(52) U.S. Cl.
CPC ....... *F02D 41/2432* (2013.01); *G05B 13/042* (2013.01)

(58) Field of Classification Search
CPC ............. F02D 41/2432; F02D 41/1406; F02D 41/2422; F02D 2041/1433; F02D 41/1405;
(Continued)

(56) References Cited

U.S. PATENT DOCUMENTS

| 7,047,125 B1 * | 5/2006 | He | F02D 41/2432 |
| | | | 701/111 |
| 7,748,217 B2 * | 7/2010 | Muller | F02D 41/1447 |
| | | | 60/602 |

(Continued)

FOREIGN PATENT DOCUMENTS

| DE | 10259851 | 7/2004 |
| DE | 10156557 | 8/2007 |

(Continued)

OTHER PUBLICATIONS

"Statistische Versuchsplanung und-auswertung" {"Statistical design of experiments and analysis"}, Eberhard Schäffler, published by Deutscher Verlag der Grundstoffindustrie, Stuttgart, 1997, pp. 1-57.
(Continued)

*Primary Examiner* — Joseph J Dallo
(74) *Attorney, Agent, or Firm* — Sheridan Ross P.C.

(57) ABSTRACT

The invention relates to a method for the operational analysis of an engine and/or for calibrating a controller of the engine, in particular an internal combustion engine, wherein run-up occurs of test points defined by values of a plurality of predetermined operating parameters and selected from a multidimensional test space using a statistical experiment design, whereby at least one operating parameter is in each case changed from one test point to the next test point in a
(Continued)

plurality of steps in the run-up of the test points, wherein operational measurements are performed at measurement points resulting from a respective increment and at the actual test points, whereby measurement data from the operational measurements for the analysis and calibration of the controller are output and continuously stored, as well as a corresponding system.

11 Claims, 6 Drawing Sheets

(58) Field of Classification Search
CPC .. F02D 41/1401; G05B 13/042; G05B 13/024
See application file for complete search history.

(56) References Cited

U.S. PATENT DOCUMENTS

| | | | |
|---|---|---|---|
| 10,360,321 B2 | 7/2019 | Umeda | |
| 2012/0197425 A1* | 8/2012 | Gross | G05B 13/042 700/110 |
| 2014/0336956 A1* | 11/2014 | Patti | F02D 41/2422 702/50 |
| 2019/0313024 A1* | 10/2019 | Selinger | G08B 13/19636 |
| 2020/0109677 A1* | 4/2020 | Forbush | G07C 5/0825 |
| 2020/0116093 A1* | 4/2020 | Geng | F02D 41/0235 |

FOREIGN PATENT DOCUMENTS

| | | | | |
|---|---|---|---|---|
| DE | 102009031630 | | 1/2011 | |
| JP | 2002-322938 | | 11/2002 | |
| JP | 2003-13794 | | 1/2003 | |
| JP | 2015-519034 | | 7/2015 | |
| WO | WO-2011053905 A1 | * | 5/2011 | ........... F02D 19/061 |
| WO | WO-2016170063 A1 | * | 10/2016 | ............. F02D 41/26 |
| WO | WO-2017021025 A1 | * | 2/2017 | ......... F02D 41/1401 |
| WO | WO-2017199006 A1 | * | 11/2017 | .......... B01J 19/0006 |
| WO | WO-2019076501 A1 | * | 4/2019 | ........ F02D 41/0002 |
| WO | WO-2019076502 A1 | * | 4/2019 | ............. F02D 21/08 |

OTHER PUBLICATIONS

Büchel et al. "Roll out of a fast calibration approach for engine base calibration," International Symposium on Development Methodology, 2009, 16 pages.

Leithgöb et al. "Methodology for efficient calibration of model based ECU structures," International Symposium on Development Methodology, 2005, 14 pages.

Kuder et al. "Bosch/AVL-iProcedures für AVL Cameo," MTZ—Motortechnische Zeitschrift, Springer, vol. 64, No. 12, Dec. 2003, pp. 1032-1038 (with machine translation).

Zimmerschied et al. "Static and Dynamic Measurements of Combustion Engines for Optimization of Control Mappings—A Brief Survey," Automatisierungstechnik, Feb. 2005, vol. 53, No. 2, pp. 87-94 (with machine translation).

International Search Report and Written Opinion for International (PCT) Patent Application No. PCT/AT2020/060400, dated Mar. 4, 2021, 15 pages.

International Preliminary Report on Patentability for International (PCT) Patent Application No. PCT/AT2020/060400, dated Feb. 10, 2022, 9 pages.

Official Action with English Translation for Japan Patent Application No. 2022-526239, dated Aug. 13, 2024, 5 pages.

* cited by examiner

METHOD AND SYSTEM FOR CALIBRATING A CONTROLLER OF AN ENGINE

CROSS REFERENCE TO RELATED APPLICATIONS

This application is a national stage application under 35 U.S.C. 371 and claims the benefit of PCT Application No. PCT/AT2020/060400 having an international filing date of 12 Nov. 2020, which designated the United States, which PCT application claimed the benefit of Austria Patent Application No. A50969/2019 filed 12 Nov. 2019, the disclosures of each of which are incorporated herein by reference in their entireties.

The invention relates to a method for calibrating a controller of an engine, in particular an internal combustion engine, wherein run-up occurs of test points defined by the values of a plurality of predetermined operating parameters and selected from a multidimensional test space using a statistical experiment design, whereby at least one operating parameter is in each case changed in a plurality of steps in the run-up of the test points.

To calibrate engines, in particular prime movers, tests are usually run on test benches, wherein an analysis, in particular a sensitivity analysis, is run on various operating parameters for specific operating points at a predefined speed and/or load. The findings gained from this analysis can be used to calibrate the controller of the internal combustion engine, whereby the objective is an optimized calibration of the internal combustion engine.

If multiple operating parameters are adjusted simultaneously for one load point such as, for example, injection timing, ignition timing, fuel pressure, manifold pressure, exhaust gas recirculation rate, etc., the result is an extremely large number of possible parameter combinations which would need to be checked individually on an engine to be tested by means of operational measurements. This would however cause considerable measurement expenditure.

Even if for example only ten different values are tested for each operating parameter, run-up would need to occur for 100 test points for two operating parameters, 1000 test points for three operating parameters, 10,000 test points for four operating parameters and 100,000 test points for five operating parameters. This effort is not feasible in practice. In order to reduce the measuring effort to an acceptable level, characteristic test points are selected from the total volume of a test space using statistical experiment design, for example by means of a so-called center composite design. This allows a significant reduction in the measuring effort, for example from a measurement of 8,000 test points to 50 test points.

In order to limit the measurement effort to a realistic level, a number of representative test points selected pursuant to specific boundary conditions are usually selected on the basis of a mathematical model.

The test points are usually selected using statistical methods, whereby a specific selection strategy is used depending on the aim and objective of the analysis. This procedure is known as statistical design of experiments. On this, see for example: "Statistische Versuchsplanung und-auswertung" {"Statistical design of experiments and analysis"}, Eberhard Schaffler, published by Deutscher Verlag der Grundstoffindustrie, Stuttgart, 1997.

According to the respective selection strategy, measurement points are either distributed evenly in a multidimensional space according to a model and/or weighted pursuant to specific boundary conditions.

Calibration methods using statistical design of experiments are generally based on empirical, time-invariant models which are parameterized with a data set from stationary measurements and then optimized and in turn verified with stationary measurements.

However, acquiring stationary measurements is relatively time-consuming and thus inefficient. An analysis of test field data yielded an average duration of approximately four minutes per test point in stationary measurement. These four minutes comprise the time to set the operating parameters to a new test point, check for a change in operating parameters, handle operating limits, a stabilization, an averaging, and a so-called screenback to starting point—and all to measure a single test point.

In the statistical design of experiments, the test points are moreover selected according to purely statistical criteria without knowledge of the actual operating limits. Therefore, depending on the respective statistical experiment design used, some of the selected test points will be outside of the operating range of the engine.

Since there are no measurements for the test points, the test points outside the operating range, or respectively unobtainable, cannot be factored into an analysis and calibration of an engine's controller or even a modeling in the context of a model-based calibration. Due to the lack of test points, or measurements at said test points respectively, the quality of the analysis results and thus the quality of a calibration are adversely affected.

A lack of test points in the unobtainable measuring range, and thus a reduction in the database, could in principle be prevented by determining the engine's operating limits for the respective load point prior to implementing the statistical experiment design and then adapting the experiment design so as to fill the entire obtainable space. However, due to the high measurement expenditure required thereto, this approach is rejected.

A range of methods for setting the operating parameters in order to generate measurements able to be used for calibrating the controller of an engine are known from the prior art.

For example, document DE 101 56 557 B4 addresses the violation of operating limits. It discloses a method for calibrating the controller of an engine, in particular an internal combustion engine, wherein the sensitivity of different operating parameters is analyzed for at least one load point and operational measurements are performed on the engine using a statistical experiment design for selected measurement points with predetermined operating parameters, whereby auxiliary measurement points are defined for at least one unobtainable measurement point lying on a connecting line between a stable central measurement point within the operating limits of the engine and the measurement point, and the closest obtainable auxiliary measurement point to the operating limit is applied as a substitute measurement point for further operational measurements.

One task of the invention is that of providing a method and system for analyzing and/or calibrating an engine which enables an improved analysis, in particular a higher content of information on the tested operating space, particularly in the scope of operating limits, without increasing the time expended for an analysis.

This invention solves this task with a method and system according to the independent claims. Advantageous embodiments are claimed in the dependent claims.

A first aspect of the invention relates to a method for calibrating a controller of an engine, in particular an internal combustion engine, a fuel cell or an electric motor, wherein run-up occurs of test points defined by the values of a plurality of predetermined operating parameters and selected from a multidimensional test space using a statistical experiment design, whereby at least one operating parameter is in each case changed from one test point to the next test point in a plurality of steps in the run-up of the test points, wherein operational measurements are performed at measurement points resulting from a respective increment and at the actual test points, whereby measurement data from the operational measurements for the analysis and calibration of the controller are output and continuously stored.

A second aspect of the invention relates to a system for calibrating a controller of an engine, in particular an internal combustion engine, comprising:
  a test bench for the run-up of test points defined by values of a plurality of predetermined operating parameters and selected from a multidimensional test space by means of a statistical experiment design,
  means for realizing run-up of the test points, configured to change at least one operating parameter in each case from one test point to the next test point in a plurality of steps,
  sensors for realizing operational measurements at measurement points resulting from a respective increment and at the actual test points, and
  a data interface for outputting measurement data from the operational measurements, on the basis of which the engine is analyzed and the controller calibrated, and
  a data storage configured for the continuous storage of the measurement data.

An operating range within the meaning of the invention is preferably a multidimensional space spanned by the operating parameters and limited by predefined operating parameter value ranges. Preferably, the value ranges are dictated by the stable operating range of the engine. Further preferably, the engine or a system functionally interacting with the engine, e.g., an exhaust after-treatment device, is impaired outside of the operating range.

Measurement data within the meaning of the invention preferably comprises values of the parameters or respectively variables as measured or observed in the operational measurements and/or the set parameters or variables respectively.

Continuously within the meaning of the invention preferably means on a continuous basis over a period of time, in particular the period for test point run-up, particularly for all of the test points. Preferably, all recorded operating parameters are stored at the same sampling rate. Should there be different measurement frequencies, either the lowest common denominator is used for the storage or all the measured values are processed so as to enable storage at a fixed sampling rate, for example 1 Hz, preferably, the signals of the operating parameters are filtered to that end, for example by way of a running average. Doing so can prevent e.g., aliasing effects.

Output within the meaning of the invention preferably means provision at an interface, particularly a user interface or a data interface.

The invention is based on the approach of not only generating information about the tested engine at the actual test points selected via the statistical experiment design but also recording information generated during the setting of the respective test point and thus making it available for the engine analysis and the calibration of the engine's controller.

Although according to the invention, the actual test points are calculated or respectively selected using statistical design of experiments, as in the prior art, the measuring methodology is based on a screening method applied between the individual test points. Therefore, the test points are linked by measurement ramps in which the operating parameters incrementally change from one test point to the next test point and measurement data is collected both at each step as well as at the measurement points themselves.

Preferably, a so-called slow dynamic slope method (referred to below as SDS) can thereby be used as a screening method. This means that the adjusting of the operating parameters which yields the ramps ensues so slowly that the recorded measurement data can be considered quasi-stationary. To that end, preferably the adjustment times between individual steps or the ramp times respectively are adapted to time constants of the operating variables, in particular the observed output variables. It has been shown that no additional stationary measurements need to be performed in order to measure an experiment design.

Reference is made to the following publications with respect to the general functioning of the SDS method: "Methodology for Efficient Calibration of Model Based ECU Structures," Leithgöb, R., Bollick, M., Büchel, M., Henzinger, F., International Symposium on Development Methodology, Wiesbaden, 2005; "Methode zur schnellen Basisbedatung von Motorsteuerungen" {"Method for fast calibration approach for engine base calibration"}, Büchel, M., Thomas, M., International Symposium on Development Methodology, Wiesbaden, 2009.

Comparative tests have shown that the method according to the invention can achieve a significant reduction in the length of time it takes to measure a test point compared to a traditional measuring method, in particular up to an approximate ⅔ reduction of the length of time.

Furthermore, the inventive method generates substantially more measurement data during this length of time so as to enable a more precise analysis of the engine's operating behavior and also yield a better, far denser database for modeling.

Lastly, due to the plurality of measured values, the measurement data recorded by means of the invention can be used for various calibration tasks. This is based on the fact that measurement points between the actual test points are also recorded, resulting in a more or less complete characterization of the test space. As a consequence, other calibration tasks than those for which the method was originally implemented can be performed on the basis of the data set, or said data set can at least supplement or form the basis of a measurement for another calibration task.

Preferably, the inventive method is a computer-based method. Accordingly, two further aspects of the invention relate to a computer program containing instructions which, when executed by a computer, prompts it to execute the steps of the method, and a computer-readable medium on which such a computer program is stored.

In one advantageous embodiment of the method, the at least one operating parameter is changed so slowly and/or such small increments are selected that the engine is operated in a quasi-stationary mode.

Correspondingly, in a further advantageous embodiment of the method, operational measurements are performed continuously, whereby preferably no separate stabilization phase in which the at least one operating parameter is kept constant is provided prior to a measurement phase in which operational measurements are made.

In a further advantageous embodiment of the method, the temporal course of changing the at least one operating parameter in steps is ramped, in particular with respect to time and/or distance covered. As a result, the measurement points preferably lie on a line. This thereby allows realizing a particularly systematic measurement of the test space.

In a further advantageous embodiment of the method, upon the exceeding of an operating limit value of an operating parameter observed by the operational measurement, run-up of the next test point is aborted and a previous test point, a predefined safe operating point or a test point subsequent to the test point is obtained. This approach to limit value exceedance enables the measuring method to continue without interruption and further measurement values relative to the test space to be analyzed to be supplied. A separate methodology for identifying an auxiliary measurement point at the operational limit, as described in the above-mentioned DE 101 56 557 B4 document, is not necessary. This thereby reduces measuring time and simplifies the overall measuring method.

In a further advantageous embodiment of the method, the measurement data is supplied to statistical or mathematical evaluation methods or modeling algorithms. For example, the measurement data can be supplied to an artificial neural network, a random forest algorithm, an interpolation procedure, a polynomial modeling algorithm, etc. On the one hand, this allows the continuous adapting of the statistical design of experiments model used for selecting the test points and, on the other, a gradual improving of a model for a model-based optimization.

In a further advantageous embodiment of the method, a model is adapted by means of the modeling algorithm and/or a test space, in particular continuously, during execution of the method. Further test points can thereby be distributed iteratively and thus optimally.

In particular, test points which have not yet been measured can be newly positioned using the particularly continuously adapted model and/or additional test points positioned using the particularly continuously adapted model. Preset target corridors can thereby be taken into account in relation to output variables. If the adapted model establishes that the values of an output variable would exceed same, the test points can be positioned differently. In particular, test points can then be optimally positioned with respect to the desired optimization objective reflected in the target corridors. This thereby further improves the quality and efficiency of the modeling algorithm(s), particularly the continuous model optimization. Within the scope of model-based optimization or respectively calibration through projections using the model, this also results in being able to prevent further limit value violations and thus achieve a more efficient test procedure.

In a further advantageous embodiment of the method, signal profiles of the measurement data are corrected by measurement channel-specific delay times. This thereby also further improves the quality and efficiency of the modeling algorithm(s), in particular the continuous model optimization.

In a further advantageous embodiment of the inventive method, a model formed or modified by means of the model algorithm is used to calculate an optimized calibration of the controller. An iterative optimization of the engine's controller can thereby be achieved within the scope of a model-based optimization.

In a further advantageous embodiment of the method, the model of the engine or the calibration of the controller is verified using further operational measurements. The values found via the method can thereby be checked for correctness relative to the engine to be tested.

In a further advantageous embodiment of the method, the measurement data can be used for different calibration tasks, whereby different input and/or output variables can be selected from among the available recorded measurement data for each calibration task.

By selecting different input and/or output variables, a wide variety of calibration tasks can be performed on the basis of the recorded measurement data.

The previously described advantages and features relative to the first aspect of the invention also apply accordingly to the further aspects of the invention and vice versa.

Further advantages and features will become apparent from the following description of exemplary embodiments referencing the figures. Shown therein at least partially schematically.

The following will describe the exemplary embodiments in respect of an internal combustion engine 1. It is however obvious to one skilled in the art that the described teaching is also applicable to other engines, in particular prime movers such as electric motors.

Figure 1:
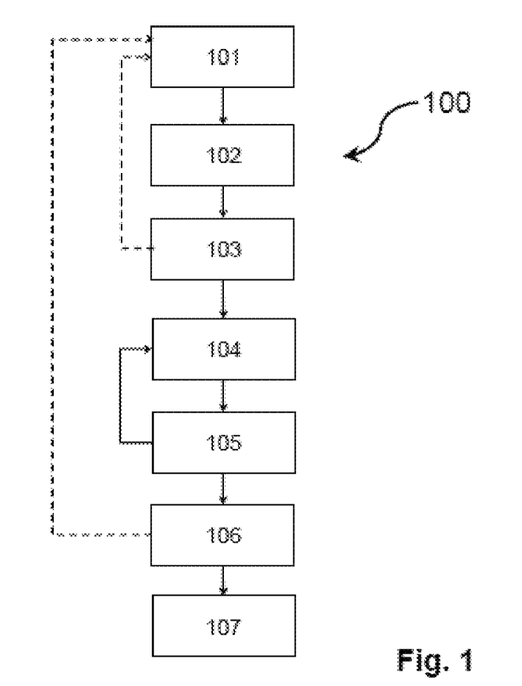
FIG. 1 a block diagram of an exemplary embodiment of a method for calibrating a controller of an engine.

FIG. 1 shows an exemplary embodiment of a method 100 for calibrating a controller of an engine 1.

The workflow into which the method 100 for calibrating a controller is integrated is preferably as follows:

First, the respective test or experiment to be performed, particularly a test run, is defined. Preferably specified is what input parameters are to be set or changed and which output parameters are to be recorded. The environmental conditions under which the test is to be carried out are specified, e.g. the temperature of the coolant. Also preferably specified are the output parameters needing to be monitored in relation to operating limits Lim and what the limit values Lim are. Based on this, adjustment ranges for the input parameters $P_1$ are specified and a space-filling design furthermore preferably generated using this key data.

Based on the test definition and the space-filling design, an experiment design is preferably created using a statistical design of experiments.

This test plan comprises a plurality of test points. Test points are thereby defined by a plurality of operating parameters P, or their values respectively, and the test space is also a multidimensional test space due to the plurality of operating parameters.

The test points are usually measured in test bench operation, for example on an engine test bench, a powertrain test bench or a roller test bench. Generally speaking, so-called stationary test benches are used to this end.

Figure 3:
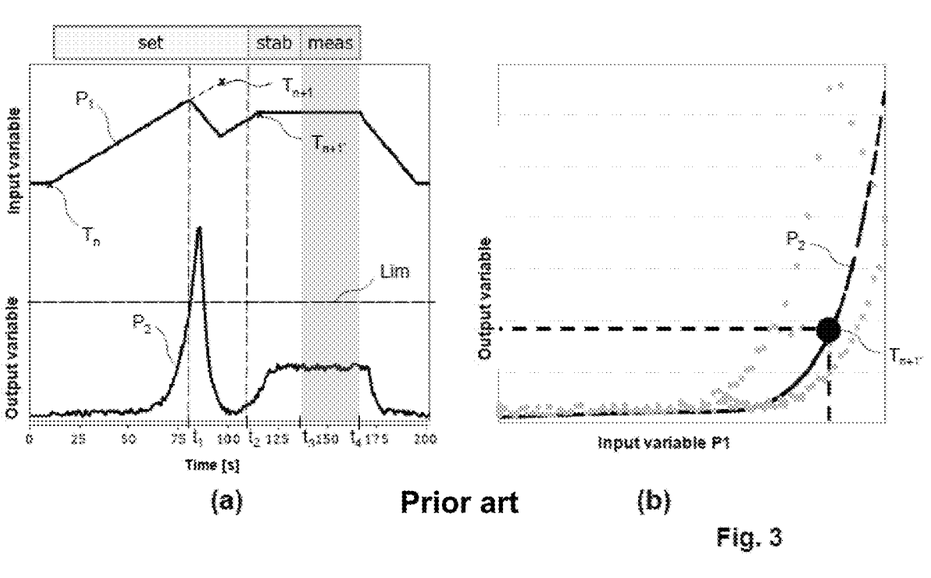
FIGS. 3a and 3b diagrams of the progression of respective input parameters/input variables and output parameters/output variables of operational measurements in a calibration method of the prior art.

The test points to be approached are set. Should the test point be reached, a wait ensues until the operation of the internal combustion engine has stabilized and upon there being only minor or no changes in the operation of the internal combustion engine during this stabilization phase STAB, a measurement is taken in measurement phase MEAS. A general sequence of such is depicted in FIG. 3a.

The calibration method 100 preferably starts at this point.

In method 100, similar to calibration methods in the prior art, run-up of the test points 101 ensues. At least one operating parameter $P_1$, which is a regulating parameter, is thereby changed in a plurality of steps from one test point $T_n$ to the next test point $T_{n+1}$.

In practice, multiple operating parameters $P_1$ are usually adjusted either simultaneously or successively. The adjustment is thereby preferably made so slowly and/or at such small increments that the internal combustion engine 1 is in a quasi-stationary operating mode.

Operational measurements are thereby performed both on those value constellations ensuing from the increment set for each operating parameter P after each step, hereinafter referred to as measurement points $M_n$, as well as at the actual test points $T_n$, $T_{n+1}$, $T_{n+2}$ ensuing from the selection via the statistical design of experiments.

Since the internal combustion engine 1 is kept in a quasi-stationary operating mode during the input parameter $P_1$ adjustment process, stabilization periods STAB are preferably not provided either before or after measuring the measurement points $M_n$ nor before or after measuring the test points $T_n$, $T_{n+1}$, $T_{n+2}$, as is the case in the prior art. The setting phase SET can therefore also be included in the measurement phase MEAS.

The measurement phase MEAS of the method 100 can thus extend over a considerably longer period of time than in the conventional calibration methods of the prior art. Preferably, the measurement phase MEAS lasts the entire duration of the method 100, further preferably without interruption.

Lastly, the measurement data from the operational measurements, which can further be used to analyze and calibrate the controller, are output and continuously stored 103.

Due to the plurality of measurements, or dense measurement data respectively, generated by the method 100, the measurement data can be used not only for the calibration task for which it was collected. It can in fact also be used for other calibration tasks, provided that the operating variables required thereto have also been measured.

The stored measurement data is preferably fed to statistical and/or mathematical evaluation methods 104. In particular, a modeling ensues using these methods. Preferably being a model of the internal combustion engine, the powertrain or the entire vehicle with which the respectively modeled component can be simulated. Preferably, the model is a so-called artificial neural network which is trained on the basis of the measurement data. However, other machine learning methods can also be used, as can polynomial models or Gaussian models, etc. Further preferably, signal delay time up until the measurement is also factored into the modeling. This is explained further below with reference to FIG. 6. The models can be preferential or selected from a library of existing example models in which relationships between the input parameters $P_1$ and output parameters $P_2$ are roughly established.

Preferably, these models are continually or continuously verified and are adapted 105 while the method 100 is being carried out.

On the basis of these models, a numerical optimization can be made in order to improve the calibration of the controller. Preferably, such an optimized calibration can already be regenerated while the inventive method 100 is being performed by repeating the statistical design of experiments or by already factoring the knowledge of the optimized calibration into the statistical design of experiments 106 respectively.

Further preferably, an optimized calibration is lastly verified via further operational measurements 107.

Figure 2:
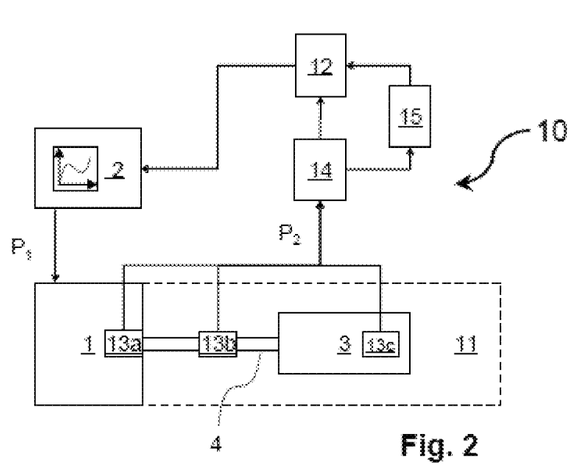
FIG. 2 a depiction of an exemplary embodiment of a system for calibrating a controller of an engine.

FIG. 2 shows an exemplary embodiment of a system for calibrating a controller of an internal combustion engine 1.

The internal combustion engine 1 is thereby preferably arranged on a test bench 11 and further preferably non-rotatably connected to a dynamometer 3 via a shaft 4 which is part of the internal combustion engine 1 or the test bench 11.

The dynamometer 3 is preferably configured to apply a load to the internal combustion engine 1. Furthermore, the test bench 11 comprises sensors 13a, 13b, 13c to record operating variables of the internal combustion engine 1. In the present case, for example, sensor 13a could record the throttle valve position, sensor 13b a torque applied to the shaft 4 and thus to the internal combustion engine 1, and sensor 13c the power expended to brake the shaft 4 and thus the internal combustion engine 1 via the dynamometer 3.

Measured values are preferably output via a data interface 14 of the system 10 for outputting measurement data from the operational measurements to a data storage 15 or directly to means 12 for the run-up of the test points $T_n$, $T_{n+1}$, $T_{n+2}$.

The means 12 for the run-up of the test points calculates the values of the input parameters $P_1$ on the basis of a statistical experiment design and/or the measurement data already generated and relays them to a controller 2 of the internal combustion engine 1. The controller sets the input parameters $P_1$ as internal combustion engine 1 setpoint values.

FIGS. 3a and 3b show two diagrams of the measurement profile of a conventional method for calibration.

The diagram of FIG. 3a thereby depicts the progression of the input parameter $P_1$ of the controller of an internal combustion engine; i.e. the set variable, and the associated progression of the output parameter $P_2$; i.e. the observed variable, as a function of time. FIG. 3b again shows a diagram of the progression of the output parameter $P_2$ as a function of the input parameter $P_1$, or the set variable respectively, in that region in which a limit violation of the output parameter $P_2$ occurs.

In FIG. 3a, after test point $T_n$ has been measured, the input parameter $P_1$ is incrementally brought to the value of subsequent test point $T_{n+1}$. This phase of the measurement process is a setting phase SET in which the input parameter $P_1$ or multiple input parameters respectively are set to the next test point $T_{n+1}$ as determined using a statistical experiment design.

In the illustrated case, a limit violation of the operating limit Lim of output parameter $P_2$ occurs at $t_1$. As a result, the input parameter $P_1$ cannot be set to controlled test point $T_{n+1}$.

The input parameter $P_1$ is consequently reset until the limit violation of output parameter $P_2$ is eliminated. Due to hysteresis or an output parameter lag time, this takes some time, as is evident from FIG. 3a, and the input parameter $P_1$ has to drop back far below the value at which the limit violation occurred.

In a next step of the method, the input parameter $P_1$ is again adjusted in each direction in which the limit violation occurred, albeit at a reduced increment. If no limit violation then occurs, a stabilization phase STAB follows at time $t_2$ at which point there is a wait until the engine is in a stationary mode of operation and only a minor or even no change in the output parameter $P_2$ at all can be observed. Once this is the case, a phase of the measurement process in which a measurement MEAS is made follows from time $t_3$ to time $t_4$. An auxiliary test point $T_{n+1'}$ is thereby measured.

As shown in FIG. 3b, only one single measurement is made of an auxiliary test point $T_{n+1'}$ in a region where the output parameter $P_2$ exhibits strong fluctuation, or a sharp gradient respectively, in relation to a change in the input parameter P1. Yet a plurality of measurement points would be advantageous particularly in a region of major changes so as to be able to precisely analyze the dependency of the output parameter $P_2$ on the input parameter P1 and be able to accordingly factor that into the modeling. This is also of particular importance because optimality when calibrating internal combustion engines often lies close to operating limits Lim.

Figure 4:
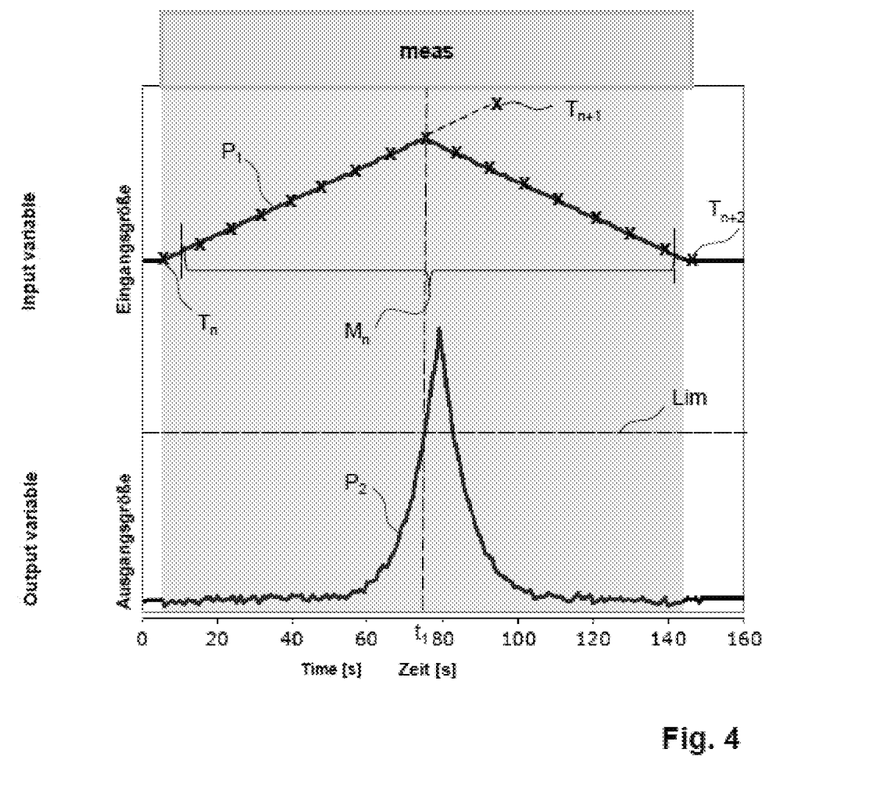
FIG. 4 a further diagram of input parameters/input variables and output parameters/output variables of operational measurements performed by means of the method for calibrating a controller of an engine.

FIG. 4 shows a diagram of a measurement profile of calibration method 100 for comparison.

Here as well, after measuring a test point $T_n$ selected using a statistical experiment design, a subsequent test point $T_{n+1}$ is approached by adjusting the at least one input parameter $P_1$. In contrast to the conventional measurement procedure, however, smaller increments are realized in method 100 and/or the run-up of subsequent test point $T_{n+1}$ occurs at a lower input parameter $P_1$ adjustment speed. The internal combustion engine 1 is thereby kept in a quasi-stationary operating mode.

Operational measurements can thus not only be performed at test points $T_n$, $T_{n+1}$ in the method 100 but also at measurement points $M_n$ resulting from an increment of the input parameter $P_1$ adjustment.

In FIG. 4, these measurement points $M_n$ are depicted by crosses on the line connecting test point $T_n$ to the next test point $T_{n+1}$. Preferably, a measurement point $M_n$ is thereby recorded after each adjustment step of input parameter $P_1$. It is however also possible to perform operational measurements only after a number of steps.

As in the case of the conventional measurement method according to FIG. 3a, the output parameter $P_2$ reaches an operating limit Lim at time $t_1$ in the depicted case. Contrary to the conventional measurement method, however, no attempt is made in method 100 to reverse the input parameter $P_1$ and then re-approach the operating limit Lim of the output parameter $P_2$ in the original adjustment direction of the input parameter $P_1$. Instead, the method 100 moves to the next test point $T_{n+2}$, which is likewise determined via the statistical experiment design. Here, too, operational measurements are made at measurement points $M_n$ after each adjustment step of the input parameter $P_1$ or after multiple adjustment steps. Alternatively, after the limit value violation at $t_1$, run-up can occur to the previous test point $T_n$ or even a predefined safe operating point, i.e. an operating point known to be within the obtainable range of the test space.

The totality of the recorded measurement points $M_n$ in FIG. 4 is identified using curly brackets. As likewise evident from FIG. 4 is that the measurement period MEAS, which preferably lasts the entire measurement process, is considerably longer than in the conventional approach in FIG. 3a.

Substantially, measurements can be performed during the entire input parameter $P_1$ adjustment process in method 100. This results in considerably higher information density in measurement phase MEAS. The measurement phase MEAS preferably lasts from the point of leaving a test point $T_n$ to reaching the operating limit Lim and in turn approaching a subsequent test point $T_{n+1}$, $T_{n+2}$ and, as can be seen from comparing the diagrams of FIG. 3a and FIG. 4, is thereby even shorter than a single measurement of the alternate test point $T_{n+1'}$ in FIG. 3a.

Figure 5:
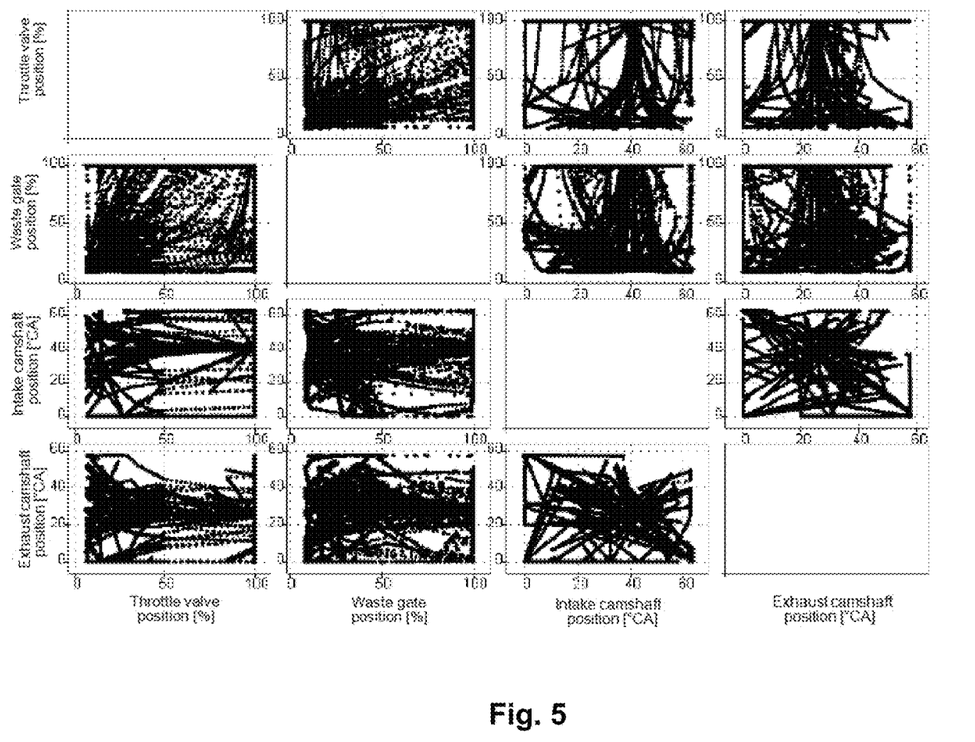
FIG. 5 various diagrams with measurement profiles recorded using the method for calibrating a controller of an engine.

FIG. 5 shows a series of diagrams, each depicting the two-dimensional test space respectively defined by the operating variables of throttle valve position, waste gate position, intake camshaft position and exhaust camshaft position indicated as input parameters along the abscissa and the identical operating variables of exhaust camshaft position, intake camshaft position, waste gate position and throttle valve position indicated as output parameters along the ordinate. Here as well, the measurements were conducted as part of method 100.

It is clear that the measurements provide very good coverage of the test spaces. The measurement density is considerably higher here than had only the few test points selected via a statistical experiment design been measured.

Because of the density of the operational measurements, the pairs of measured operational parameters can be used not only for a single calibration task but the recorded operational measurements can also be used for other calibration tasks in which the test spaces are preferably more or less the same as the test spaces shown in FIG. 5.

A consideration of a signal lag time in the modeling is described with reference to FIG. 6. This relates to dealing with time-delayed signals in method 100. As is known, many real measurement signals have a delay time, e.g., due to line lengths to the measuring sensor for a measuring medium (such as with emission measuring devices) or due to time lags (such as with temperature measurement points). Particularly real output and emission measurement signals are measured with a certain delay. When this measurement data is to be treated as (quasi) stationary, the respective time delay relative to these signals needs to be factored into the modeling.

Typical delay times for e.g., emission measuring devices are in the range of a few seconds.

Within the scope of the exemplary embodiment of method 100 as described, preferably the modeling algorithm decides, particularly in post-processing, which lag time is the most appropriate. Various output parameter models, e.g., emissions having an identical model structure but different transmission signal lag times, are thus generated via a modeling algorithm.

To that end, each vector is preferably shifted by three different lag times of x, y and z seconds and the empirical model algorithms then test which delay is the most appropriate and therefore exhibits the best model quality $R^2$. This is then used for the final data evaluation and any potential optimization necessary. That means that the model having a simulated lag time which best matches the measured lag time, i.e., exhibits the best model quality $R^2$, is selected as the model for the optimization.

Figure 6:
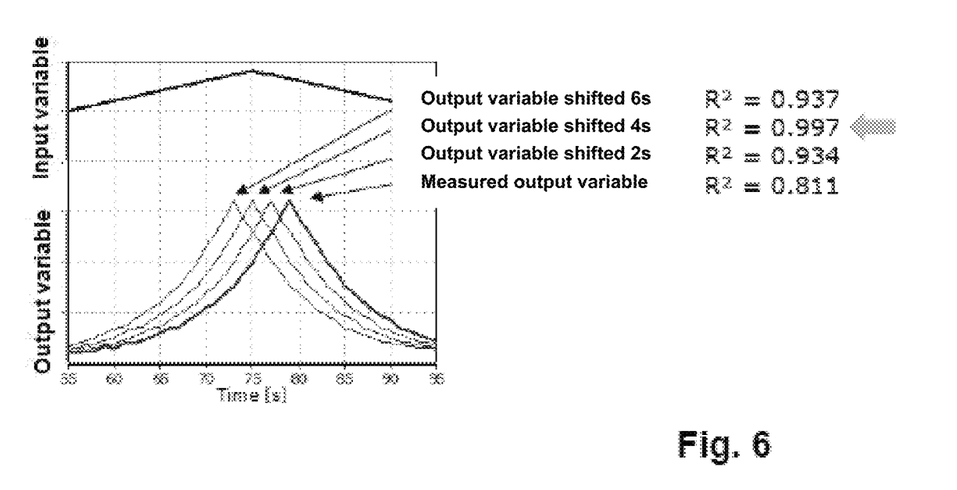
FIG. 6 a diagram pursuant to FIG. 4, wherein different delay times are shown for output parameter(s)/output variable(s) determined by means of a model and measured output parameter(s)/output variable(s).

In FIG. 6, this is the model incorporating a 4s lag time for the output parameter.

Figure 7A:
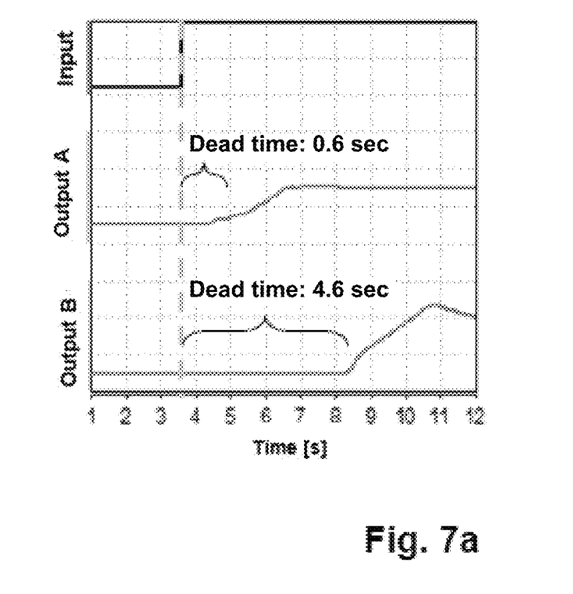
FIGS. 7a and 7b diagrams of the temporal course of an example input parameter and the output variables resulting therefrom at an assumed delay/dead time as compensated by the method by the shifting of the faster input and output variables.
Figure 7B:
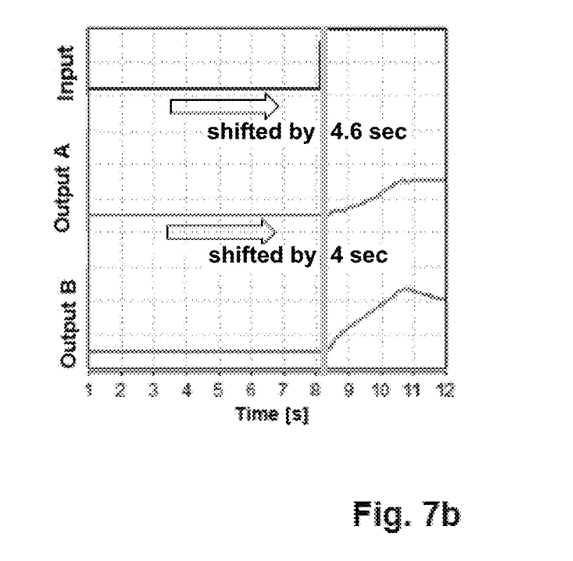

In a further advantageous embodiment of the method 100, measurement data signal profiles over a test run during which the method 100 is executed are corrected by measurement channel-specific delay times. These delay times can result in particular from signal propagation delays or control paths. Such measurement channel-specific delay times in collected raw data are depicted in FIG. 7a for an input, an output A and an output B. All the signals are thereby synchronized to the signal with the longest delay time. Such a correction for the input and output A is depicted in FIG. 7b. In the illustrated case, the input, in particular a signal profile of an input variable, is shifted by 4.6s and the output A, in particular a signal profile of an output variable A, is shifted by 4s. This is indicated by the arrows. The temporal relationships between the signals can thereby be restored. A change in the value of the input in the form of a theta function induces a signal response (step response) of outputs A and B. This thereby further improves the quality and efficiency of the modeling algorithms, particularly the continuous model optimization.

In a further advantageous embodiment of the method 100, the delay times of the measurement channels are determined individually prior to the start of the measuring program by adjusting the input parameter(s) and analyzing the signals, particularly of the output parameters, associated with the delay, for instance by evaluating step responses as shown in FIG. 7a and FIG. 7b, for example. This can ensue, preferably in automated fashion, either in advance or in the course of the method 100.

The above-described exemplary embodiments are merely examples which are in no way to be limiting of the scope of protection, the application or the configuration. Rather, the preceding description affords one skilled in the art a guideline for the implementation of at least one exemplary embodiment, whereby various modifications can be made, in particular with regard to the function and arrangement of the described components, without departing from the protective scope resulting from the claims and equivalent combinations of features. In particular, individual exemplary embodiments may be combined with one another.

LIST OF REFERENCE NUMERALS

1 engine
2 controller
3 dynamometer
4 shaft
10 system
11 test bench
12 means for test point run-up
13a, 13b, 13c sensors
14 data interface
15 data storage
$P_1$ input parameter, input variable
$P_2$ output parameter, output variable
$T_n$, $T_{n+1}$, $T_{n+2}$ test point
$T_{n+1}$ auxiliary test point
$t_1$, $t_2$, $t_3$, $t_4$ time
$M_n$ measurement point
Lim operating limit

What is claimed is:

1. A method for the operational analysis of an engine and/or for calibrating a controller of the engine,
wherein run-up occurs of test points defined by values of a plurality of predetermined operating parameters and selected from a multidimensional test space using a statistical experiment design, whereby operating parameters of the plurality of predetermined operating parameters are in each case changed from one test point to the next test point in a plurality of steps in the run-up of the test points by a slow dynamic slope method;
wherein operational measurements are performed at measurement points resulting from a respective increment and at the test points so that the test points are linked by measurement ramps, whereby measurement data from the operational measurements for the operational analysis of the engine and/or calibration of the controller are output and continuously stored; and
wherein the measurement data is supplied to a modeling algorithm, whereby a model is adapted by the modeling algorithm during execution of the method, wherein at least one of test points which have not yet been measured or additional test points are positioned using the adapted model.

2. The method according to claim 1, wherein operational measurements are performed continuously, whereby no separate stabilization phase in which at least one operating parameter is kept constant is provided prior to a measurement phase in which operational measurements are made.

3. The method according to claim 1, wherein the temporal course of changing operating parameters in steps is ramped.

4. The method according to claim 1, wherein upon the exceeding of an operating limit value of an operating parameter observed by the operational measurement, run-up of the next test point is aborted and a previous test point, a predefined safe operating point or a test point subsequent to the next test point is obtained.

5. The method according to claim 1, wherein signal profiles of the measurement data are corrected by measurement channel-specific delay times during execution of the method.

6. The method according to claim 1, wherein the model formed or modified by the modeling algorithm is used to calculate an optimized calibration of the controller.

7. The method according to claim 6, wherein at least one of the model or the optimized calibration of the controller is verified using further operational measurements.

8. The method according to claim 1, wherein the measurement data is usable for different calibration tasks, whereby at least one of different input variables or different output variables are selected from among the available recorded measurement data for each calibration task.

9. A computer program containing instructions which, when executed by a computer, prompts the computer program to execute the steps of a method according to claim 1.

10. A non-transitory computer-readable storage medium having stored thereon a computer program containing instructions, that when executed by a processing unit of a computer cause to be performed a method according to claim 1.

11. A system for the operational analysis of an engine and/or for calibrating a controller of the engine, comprising:
a test bench for a run-up of test points defined by values of a plurality of predetermined operating parameters and selected from a multidimensional test space by a statistical experiment design,
a run-up device for realizing the run-up of the test points, the run-up device configured to change operating parameters of the plurality of predetermined operating parameters in each case from one test point to the next test point in a plurality of steps using a slow dynamic slope method;
sensors for realizing operational measurements at measurement points resulting from a respective increment and at the test points so that the test points are linked by measurement ramps;
a data interface for outputting measurement data from the operational measurements, on the basis of which the engine is analyzed and/or the controller is calibrated; and a data storage configured for the continuous storage of the measurement data, wherein the system is configured to supply the measurement data to at least one of a statistical or mathematical evaluation method or a modeling algorithm, adapt a model by at least one of the modeling algorithm or a test space during execution of the method, and position at least one of test points which have not yet been measured or additional test points using the adapted model with definable target corridors for output variables which are optimally defined with regard to a desired optimization objective.

* * * * *